(12) United States Patent
Parker

(10) Patent No.: US 9,826,807 B1
(45) Date of Patent: Nov. 28, 2017

(54) UMBRELLA SUPPORT APPARATUS

(71) Applicant: Joseph Steven Parker, Valdosta, GA (US)

(72) Inventor: Joseph Steven Parker, Valdosta, GA (US)

( * ) Notice: Subject to any disclaimer, the term of this patent is extended or adjusted under 35 U.S.C. 154(b) by 0 days.

(21) Appl. No.: 15/064,223

(22) Filed: Mar. 8, 2016

(51) Int. Cl.
*A45B 25/22* (2006.01)
*A45B 25/02* (2006.01)
*F16M 11/32* (2006.01)

(52) U.S. Cl.
CPC .............. *A45B 25/22* (2013.01); *A45B 25/02* (2013.01); *F16M 11/32* (2013.01)

(58) Field of Classification Search
CPC . A45B 11/00; A45B 2023/0012; A45B 25/02; A45B 25/22; A45B 2023/0075; Y10S 135/902; F16M 11/32; F16M 11/245; F16M 11/34
USPC ....... 135/15, 16, 19, 20.1, 25.4, 27, 98, 902; 248/454, 432, 170, 439, 188, 188.8, 248/188.91, 530, 525, 518, 516, 545, 519; 52/149–152
See application file for complete search history.

(56) References Cited

U.S. PATENT DOCUMENTS

| | | | | |
|---|---|---|---|---|
| 2,903,856 A * | 9/1959 | En Dean | ................. | E04H 12/20 405/225 |
| 3,077,035 A * | 2/1963 | Hackney | ................ | G01C 15/06 248/188.2 |
| 3,327,723 A * | 6/1967 | Burgin | .................... | E04H 15/44 135/147 |
| 4,832,304 A * | 5/1989 | Morgulis | ............ | E04H 12/2223 135/16 |
| 5,293,889 A * | 3/1994 | Hall | ......................... | A45B 3/00 135/16 |
| 5,339,847 A * | 8/1994 | Kanter | .................... | A45B 23/00 135/16 |
| 6,371,139 B1 * | 4/2002 | Simchori | ............ | E04H 12/2223 135/16 |
| 6,955,609 B1 * | 10/2005 | Hiltner, Jr. | ............. | A63B 55/10 116/173 |
| 7,246,783 B2 * | 7/2007 | Harold | ................... | A45B 25/00 135/16 |
| 7,500,328 B1 * | 3/2009 | Bean | ....................... | F41A 23/08 42/94 |
| 7,794,341 B2 * | 9/2010 | Tarng | ..................... | A63B 43/02 273/400 |
| 7,993,107 B2 * | 8/2011 | Gevers | .................... | F03D 1/001 248/163.1 |
| 2005/0023429 A1 * | 2/2005 | Gardner | ................. | G01C 15/08 248/530 |

* cited by examiner

*Primary Examiner* — Winnie Yip
(74) *Attorney, Agent, or Firm* — Smith Moore Leatherwood LLP; Thomas W. Epting

(57) ABSTRACT

Umbrella support apparatuses and kits are provided. The umbrella support apparatus may be used to support umbrellas where stability is desired. The umbrella support apparatus includes an umbrella or be used with existing umbrellas having a support shaft, a collar connected to an approximate mid-point of the support shaft, at least one auxiliary support shaft angularly connected to the collar with a connector for supporting the umbrella against an external force.

11 Claims, 5 Drawing Sheets

UMBRELLA SUPPORT APPARATUS

TECHNICAL FIELD

The technical field generally relates to umbrellas and more specifically umbrella bracing and support.

BACKGROUND

Umbrellas are used in a variety of circumstances. Umbrellas may be employed to provide protection against weather conditions such as rain, snow, sleet, hail, and sunlight. Umbrellas may be of a size for a single person to use or for multiple people to use. However, when the canopy of an umbrella is unfurled, the umbrella may be vulnerable to wind.

Umbrellas may be used in beach settings to provide shade. Umbrellas used in beach settings, typically referred to as "beach umbrellas," are typically portable and are anchored in sand. Due to the unstable nature of the surface they are placed in, beach umbrellas may move out of position or become unanchored. Furthermore, the lack of solid anchoring makes beach umbrellas more susceptible to wind. Wind may push a beach umbrella out of position or dislodge it completely, depending on the strength and direction of the wind and the stability of the umbrella support.

SUMMARY

Disclosed herein are apparatuses for a braced umbrella.

In an embodiment, a device is provided. A device may comprise a generally cylindrical first shaft, a collar connected with the generally cylindrical shaft, a generally cylindrical second shaft which may be connected with the connector, and a canopy connected with the second shaft.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings in which like numerals represent like parts, wherein.

DETAILED DESCRIPTION OF ILLUSTRATIVE EMBODIMENTS

Figure 1:
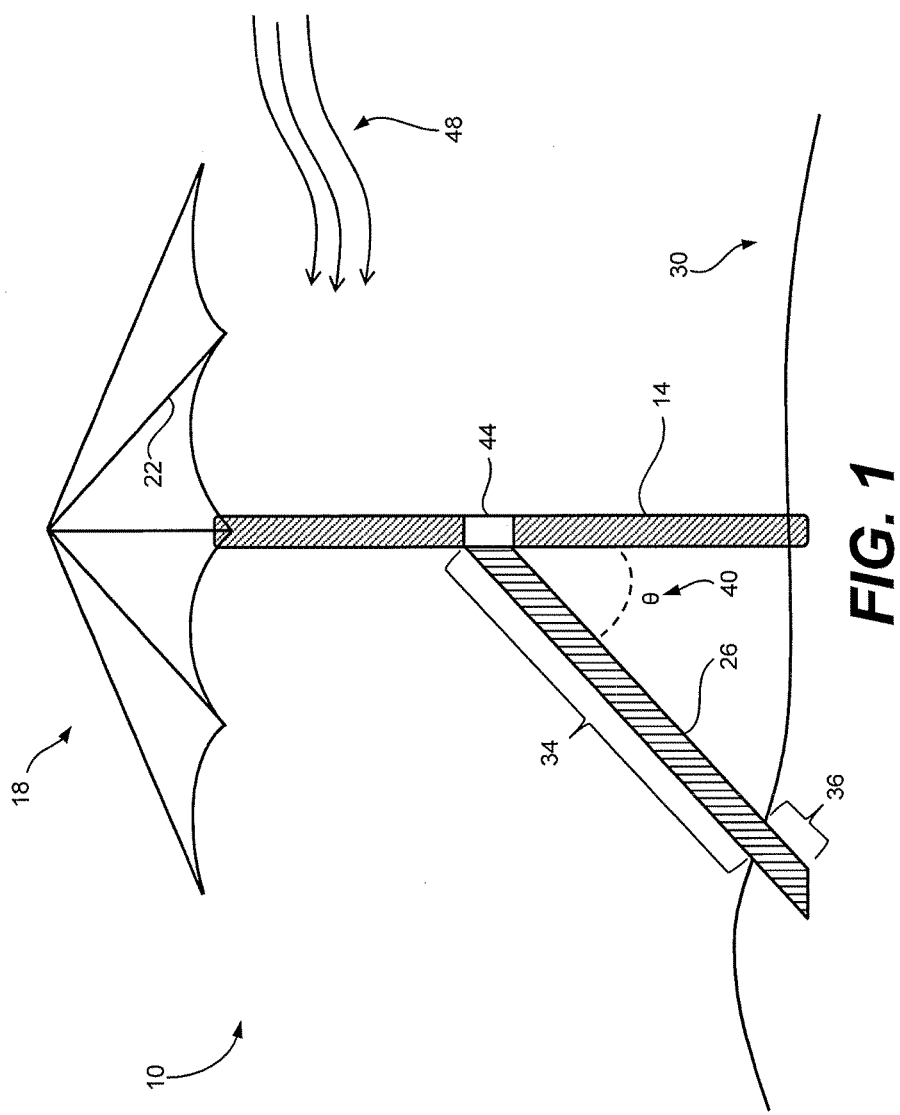
FIG. 1 is an exemplary illustration of an umbrella support apparatus.

FIG. 1 is an exemplary illustration of umbrella apparatus 10. The exemplary embodiments will be described with respect to a beach umbrella, but those skilled in the art will understand that other embodiments of the disclosure may include differing uses and still remain within the scope of the appended claims. As shown in FIG. 1, umbrella apparatus 10 has shaft 14 connected to canopy 18. As will be understood by those skilled in the art, there are various known mechanisms for attaching canopy 18 to shaft 14. For example, canopy 18 may have support rods, such as rod 22 which are connected to both the canopy 18 and shaft 14. Shaft 14 may have a center piece 44, which in the example of FIG. 1, forms a sleeve around shaft 14. Shaft 14 may be configured for inserting into surface 30. Umbrella support apparatus 10 may have an auxiliary shaft 26. Auxiliary shaft 26 may be placed against shaft 14 or connected to shaft 14 at connector 44 in a variety of ways as will be described in more detail below. In use, auxiliary shaft 26 may be placed so as to provide additional stability to the umbrella apparatus 10. Auxiliary support shaft 26 and shaft 14 may form angle 40. Angle 40 may be set such that support shaft 26 provides stability against wind, represented by lines 48. The additional stability may, for example, be realized by placing the auxiliary shaft 26 in a position so as to counteract the force of the wind illustrated by wind lines 48 on the umbrella apparatus 10. Auxiliary shaft 26 may be placed in surface 30, and have a distal end 36 configured to be used below surface 30 and a proximal end 34 configured to sit above surface 30 and connect to shaft 14. Changing conditions, such as, for example, changes in weather, the position of the sun, and the state of surface 30, may make changing angle 40 advantageous to maintaining the stability of umbrella support apparatus 10. In one embodiment, connector 44 may allow shaft 14 to change position such that angle 40 may be increased or decreased.

Figure 2:
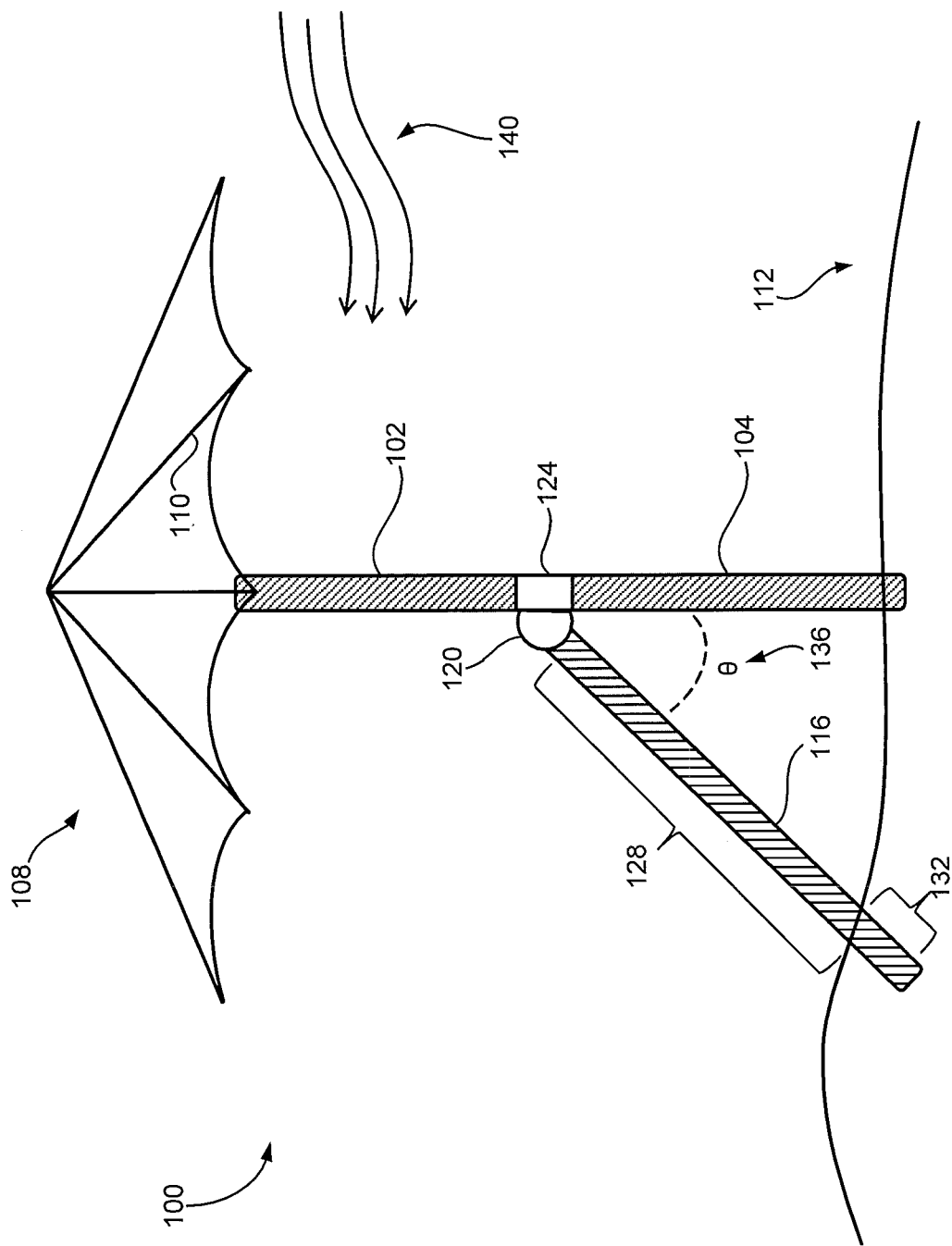
FIG. 2 is an exemplary illustration of an umbrella support apparatus.

FIG. 2 is an exemplary illustration of another embodiment of umbrella apparatus 100. As shown in FIG. 2, umbrella support apparatus 100 has first shaft 102 with one end supporting canopy 108 which may have support rods, such as support rod 110. Support rods may be used to collapse and unfurl canopy 108. The other end of first shaft 102 may be connected with collar 124. Umbrella apparatus 100 may have second shaft 104. One end of second shaft 104 may be connected with collar 124. The other end of second shaft 104 may be placed into surface 112. Umbrella apparatus 100 may have auxiliary support shaft 116. Auxiliary support shaft 116 may connect on one end 128 with connector 120 which may be attached to collar 124. The other end 132 of support shaft 116 may be placed into surface 112, wherein the other end 132 may be placed beneath surface 112. Auxiliary support shaft 116 and shaft 104 may form angle 136. Angle 136 may be set such that support shaft 116 provides stability against wind, represented by lines 140. First shaft 102, second shaft 104, and auxiliary support shaft 116 may be interchangeable in position, and may be of the same dimensions. For example, in one embodiment, support shaft 116 may be used in the position of second shaft 104, while second shaft 104 is used in the position of support shaft 116.

Changing conditions, such as, for example, changes in weather, the position of the sun, and the state of surface 112, may make changing angle 136 advantageous to maintaining the stability of umbrella support apparatus 100. In one embodiment, connector 120 may allow shaft 116 to change position such that angle 136 may be increased or decreased. Shaft 104 may include joints for tilting and positioning canopy 108. Moreover, collar 124 may be rotatably connected to shaft 104 such that the direction of auxiliary shaft 128 may also change as the direction of the wind 140 changes.

In one embodiment, collar 124 bisects shaft 104 into a first end and second end. The first end may be connected with canopy 108 while the second end may be inserted into surface 112. In one embodiment, the first end may be detachable from collar 124 and may be telescoping. Similarly, the second end of shaft 104 may be detachable from collar 124 and may be telescoping. Collar 124 may allow the proximal end to be tilted.

Figure 3:
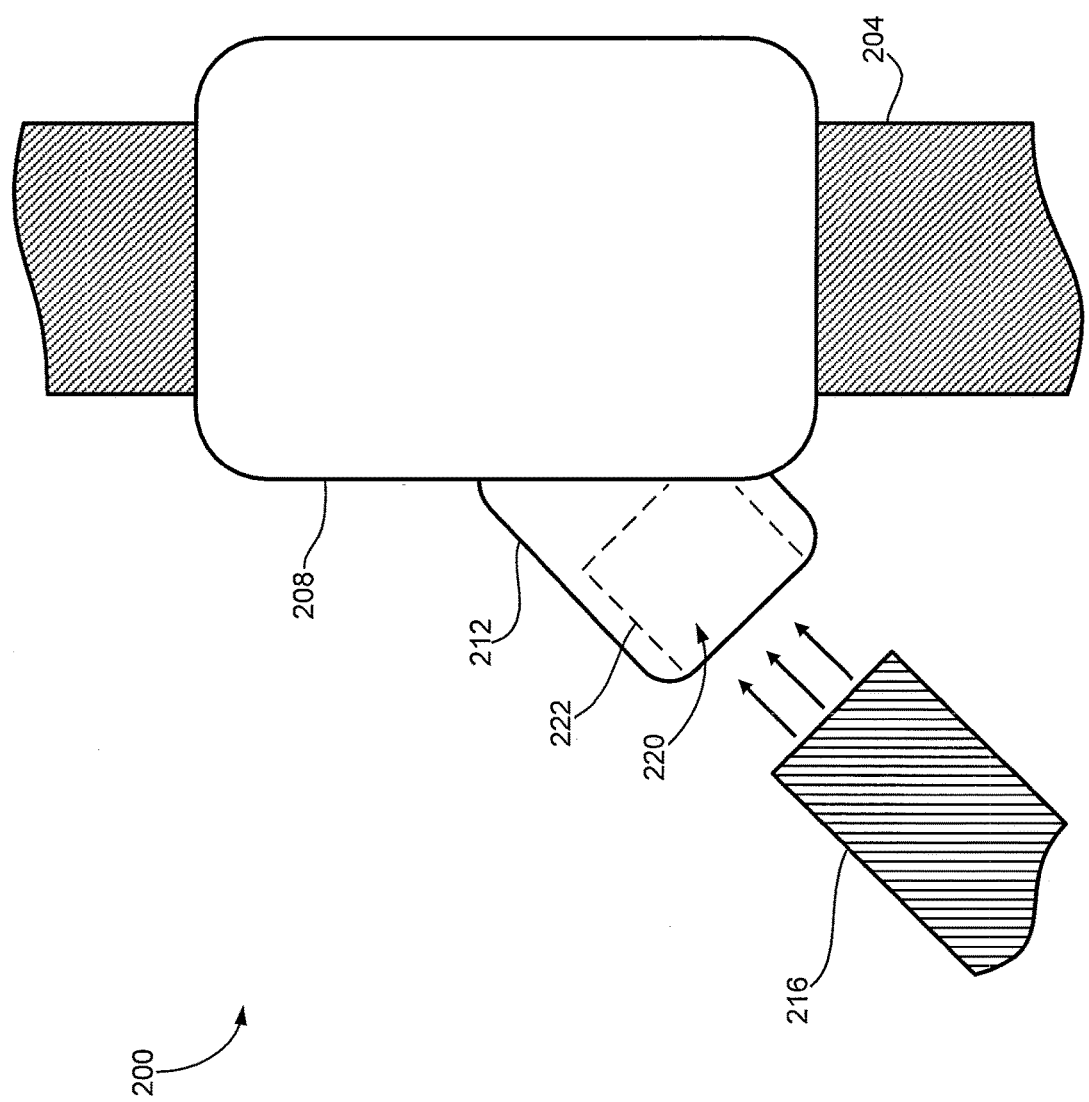
FIG. 3 is an exemplary illustration of an umbrella support apparatus collar.

FIG. 3 is an exemplary illustration of umbrella apparatus collar 200. Umbrella support apparatus collar 200 may include collar 208 fitted around shaft 204. Collar 208 may be connected with connector 212 which may be configured to receive one end of shaft 216. In another embodiment, shaft 216 is permanently connected with connector 212. Cavity 220 may be a socket. In one embodiment, an end of shaft 216 may be configured to have a ball (not shown) mated to the socket of cavity 220. Insertion of the ball end of shaft 216 into the socket of cavity 220 may create a ball-and-socket joint.

Cavity 220 may include a screw thread which may be mated to a screw thread on an end of a shaft, such as shaft 216. The shaft may have a rotatable end segment, allowing the shaft to be connected with cavity 220 by rotating just the end segment rather than the entire shaft. In another embodiment, cavity 220 may include a friction catch. The friction catch may be magnetic such that the end of the shaft being inserted into cavity 220 has an opposing charge. In another embodiment, cavity 220 may include a latch (not shown). The latch in cavity 220 may correspond to a latching member on shaft 216. The latch may be triggered in a variety of ways. For example, shaft 216 may be inserted into cavity 220, and the latching member on shaft 216 may engage with the latch. In another embodiment, engaging the latch may further require rotating shaft 216. The latch may be released by applying a pulling force to the shaft. In another embodiment, umbrella support apparatus collar 200 may include a latch release trigger, such as a button, which disengages the latch and allows shaft 216 to be withdrawn. The latch release trigger may be mounted, for example, on connector 212 or collar 208.

Figure 4:
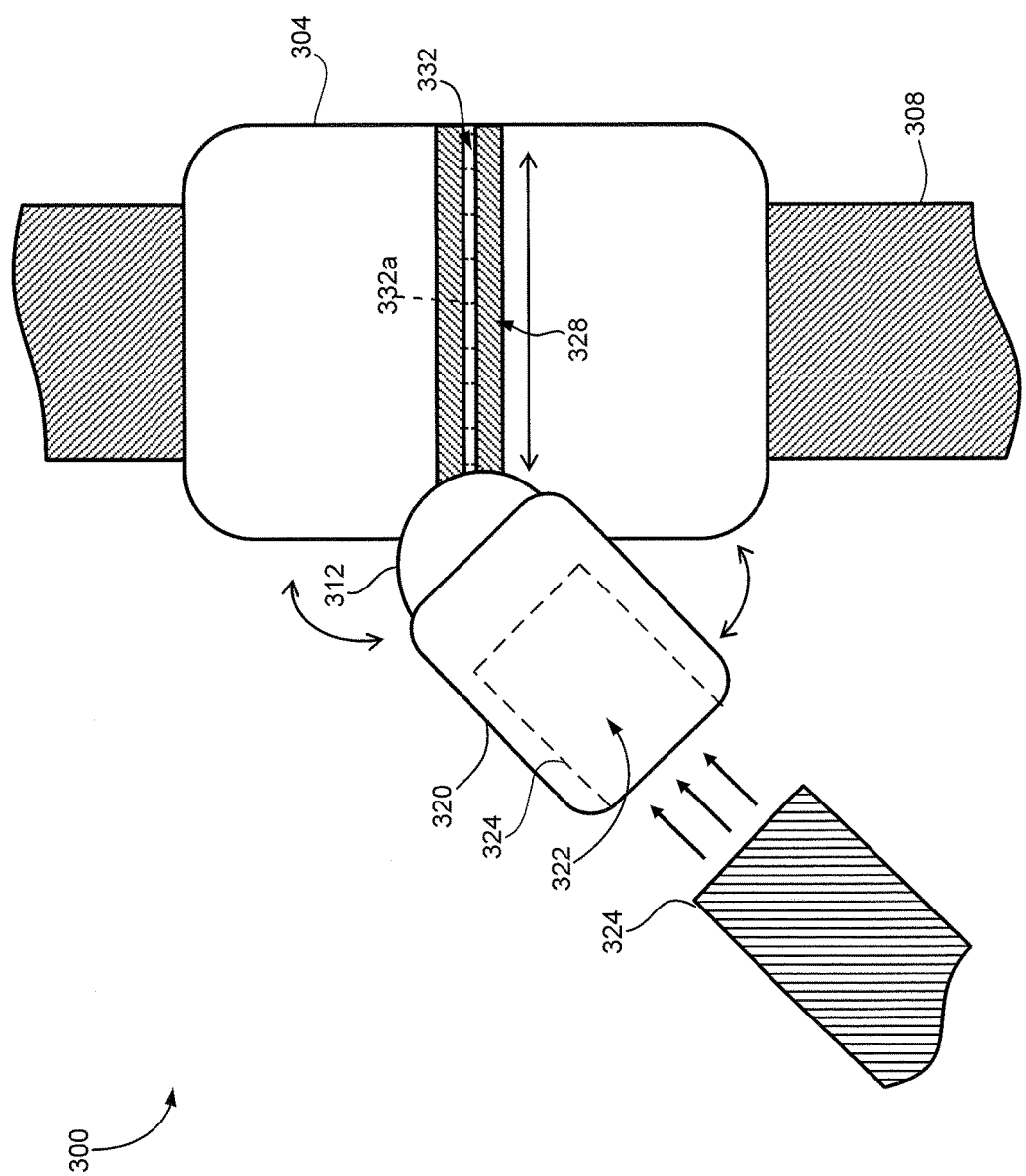
FIG. 4 is an exemplary illustration of an umbrella support apparatus collar.

FIG. 4 is an exemplary illustration of an umbrella support apparatus collar 300. Umbrella support apparatus collar 300 may have collar 304 fitted around shaft 308. Collar 304 may be connected with mount 312. Mount 312 (which could be a circular disc or sphere captured by and rotatable and/or fixed with respect to connector 320) may be connected with ridge 332 set in groove 328. Mount 312 may be connected with connector 320. Shaft 324 may be inserted into connector 320. Connector 320 may have cavity 322 for the insertion of shaft 324. Mount 312 may move generally rectilinearly along ridge 332 of collar 304. In one embodiment, ridge 332 may have teeth 332a for selectively engaging corresponding teeth or projection(s) (not shown) of mount 312 to allow mount 312 to be selectively locked to the ridge 332 in various positions along ridge 332. Ridge 332 and groove 328 may span the circumference of collar 304, or may span less than the circumference of collar 304. Mount 312 may be rotated to allow shaft 324 to be positioned at different angles with respect to shaft 308. Mount 312 may be locked into a position providing a certain angle, and unlocked when a different angle is desired.

Figure 5:
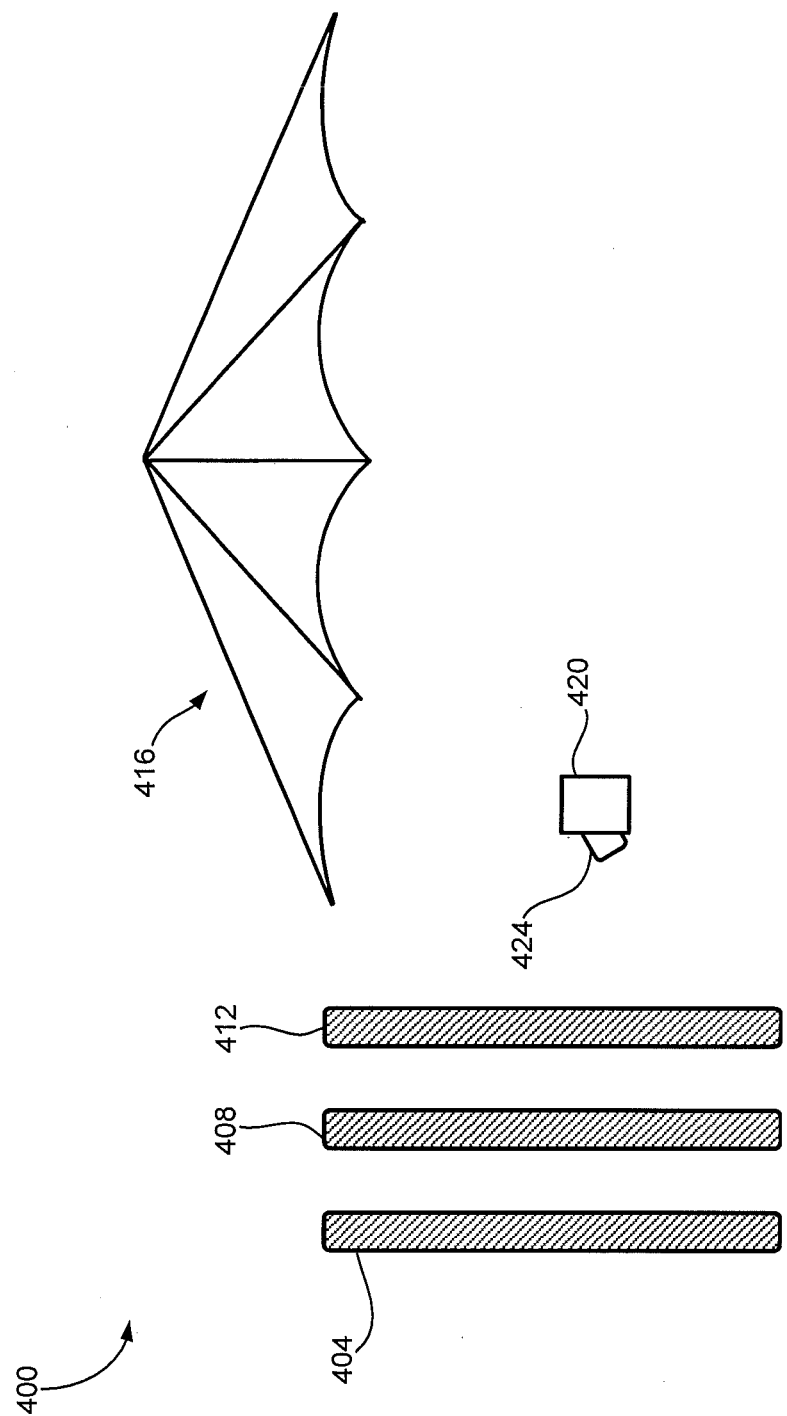
FIG. 5 is an exemplary illustration of an umbrella support apparatus kit.

FIG. 5 is an exemplary illustration of umbrella apparatus kit 400. Umbrella support apparatus kit 400 may include shafts, such as shaft 404, shaft 408, and shaft 412. Umbrella support apparatus kit 400 may include a canopy 416 and a collar 420. Collar 420 may include connector 424 for receiving a support shaft. Shafts for umbrella support apparatus kit 400, such as shaft 404, shaft 408, and shaft 412, may be of equal dimensions, and may be telescoping. The shafts may be inserted into collar 420. In one embodiment, shaft 404 and shaft 408 may be connected with collar 420. In this embodiment, shaft 404 may serve as a vertical support. Shaft 408 may be set into a position such that shaft 408 forms an acute angle with shaft 404. Shaft 412 may be connected with the collar for receiving canopy 416. In one embodiment, shaft 404, shaft 408, and shaft 412 each may be able to receive canopy 416. In another embodiment, canopy 416 has an attachment or adapter to enable canopy 416 to connect with shaft 404, shaft 408, or shaft 412. In another embodiment, a coupler or adapter is provided to connect canopy 416 with a shaft. The lengths of shaft 404, shaft 408, and shaft 412 may be adjusted by telescoping the shafts to the desired lengths. In one embodiment, canopy 416 may have folding support rods. In another embodiment, canopy 416 may be collapsed, and shaft 404, shaft 408, and shaft 412 may be telescoped into compact forms. Canopy 416, shaft 404, shaft 408, shaft 412, and collar 420 may then be stored or transported within a single container.

It will be understood that collars referred to herein may be of adjustable size to fit shafts of a variety of circumferences and be configured for a variety of mating mechanisms. In one embodiment, a collar utilizes a clamp, which may include a hinge, arcuate members, and mating ends. In one embodiment, a collar includes a snap-on clamp (not shown). In another embodiment, a collar uses hook-and-loop fasteners. In another embodiment, a collar is a sleeve which is slid over a shaft. In another embodiment, a collar uses a latch. In another embodiment, a collar uses a vise. A collar may employ a combination as well. In one embodiment, a collar is a sleeve with hook and loop fasteners for securing it to the shaft. In another embodiment, a collar may have two or more clamps. A collar may be made of a variety of materials, such as plastic, metal, or a combination of materials, such as plastic and metal. Collars may have connectors to allow attachment of multiple shafts. In one embodiment, a collar may be rotatable about a shaft it is mounted on. The shaft may remain stable while the collar rotates around the shaft. In one embodiment, a collar may include at least one bearing (not shown). The bearing may allow shafts connected with the collar to be tilted.

A collar, such as collar 124, collar 208, collar 304, or collar 420 may be adjustable in position. In one embodiment, a collar may be adjusted in position along a shaft it is mounted on. For example, a collar may comprise a clamp to affix the collar to the shaft. The collar may then be tightened into place on the shaft. In one embodiment, the collar includes a bolt (not shown) which may be tightened to decrease the circumference of the circle formed by the closed clamp, thus increasing the friction the pressure applied by the clamp to the shaft. Loosening the bolt allows the collar to be moved along the shaft, as the clamp is still closed.

Shafts, such as shaft 116, shaft 216, shaft 324, shaft 404, shaft 408, and shaft 412, may be telescoping. Shafts may have a hollow outer section containing a number of hollow inner sections. In one embodiment, the hollow outer section may contain a first hollow inner section, and the first hollow inner section may contain a second hollow inner section. The first hollow inner section may be slidably mounted in the hollow outer section. The second hollow inner section may be slidably mounted in the first hollow inner section. In one embodiment, the shaft is cylindrical, but the shaft may also be a triangular prism, rectangular prism, hexagonal prism, and so forth. A shaft may be comprised of a variety of materials, such as plastic or metal, or a combination of materials, such as metal coated with plastic.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a," "an," and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

The written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements.

What is claimed:

1. An umbrella device, comprising:
    a canopy;
    at least one support shaft supporting the canopy;
    a collar generally encircling an approximate mid-point of the support shaft;
    a connector connected to the collar;
    at least one auxiliary support shaft connected to the connector wherein the auxiliary support shaft is at an angle to the support shaft and wherein the auxiliary support shaft is configured to support the umbrella against an external force
    the collar including a ridge; and
    the connector being adapted to move generally rectilinearly along the ridge and to selectively be locked to the ridge.

2. The umbrella device of claim 1, wherein the collar comprises at least one of a clamp, a sleeve, hook-and-loop fasteners, a vise, and a latch.

3. The umbrella device of claim 1, wherein the collar is rotatably connected to the support shaft thereby allowing the auxiliary support shaft to rotate relative to the support shaft.

4. The umbrella device of claim 1, wherein the support shaft and the auxiliary support shaft are telescoping.

5. The umbrella device of claim 1, wherein the collar further comprises a socket adapted to receive the auxiliary support shaft.

6. The umbrella device of claim 1, wherein the collar is permanently connected only with the support shaft.

7. The umbrella device of claim 1, wherein the connector is permanently connected with the auxiliary support shaft.

8. The umbrella device of claim 1, wherein the collar bisects the at least one support shaft into a first segment and a second segment.

9. The umbrella device of claim 1, wherein the connector is permanently connected with the collar.

10. An umbrella support apparatus kit, comprising:
    a canopy;
    at least one support shaft adapted to support the canopy;
    a collar adapted to receive the support shaft and to substantially encircle an approximate mid-point of the support shaft;
    at least one auxiliary support shaft;
    a connector adapted to be connected to the auxiliary support shaft and the collar and to position the auxiliary support shaft is at an angle relative to the support shaft
    the collar including a ridge; and
    the connector being adapted to move generally rectilinearly along the ridge and to selectively be locked to the ridge.

11. A method of supporting an umbrella having a canopy and at least one support shaft that supports the canopy, the method comprising:
    providing a collar having a ridge;
    attaching the collar such that the collar substantially encircles the support shaft at an approximate mid-point of the support shaft;
    connecting at least one auxiliary support shaft to the collar with a connector adapted to move generally rectilinearly along the ridge such that the auxiliary support shaft is at an angle to the support shaft; and
    selectively locking the connector to the ridge, and wherein the auxiliary support shaft is configured to support the umbrella against an external force.

* * * * *